Jan. 12, 1954   J. FOSSA   2,665,823
CEMENT HANDLING MEANS FOR THERMOPLASTIC ADHESIVES
Filed Dec. 19, 1951   4 Sheets-Sheet 3

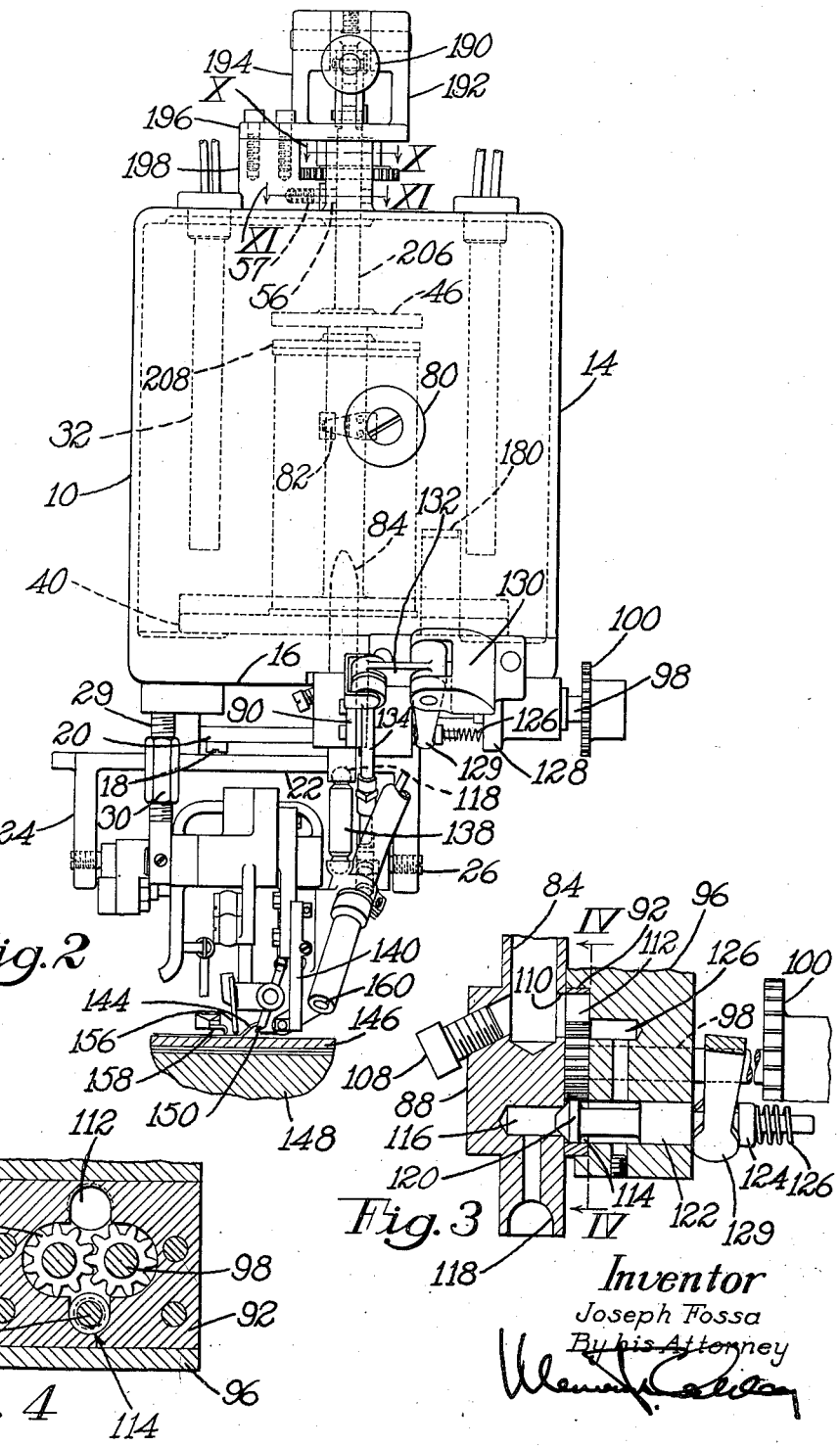

Inventor
Joseph Fossa
By his Attorney

Jan. 12, 1954 J. FOSSA 2,665,823
CEMENT HANDLING MEANS FOR THERMOPLASTIC ADHESIVES
Filed Dec. 19, 1951 4 Sheets-Sheet 4
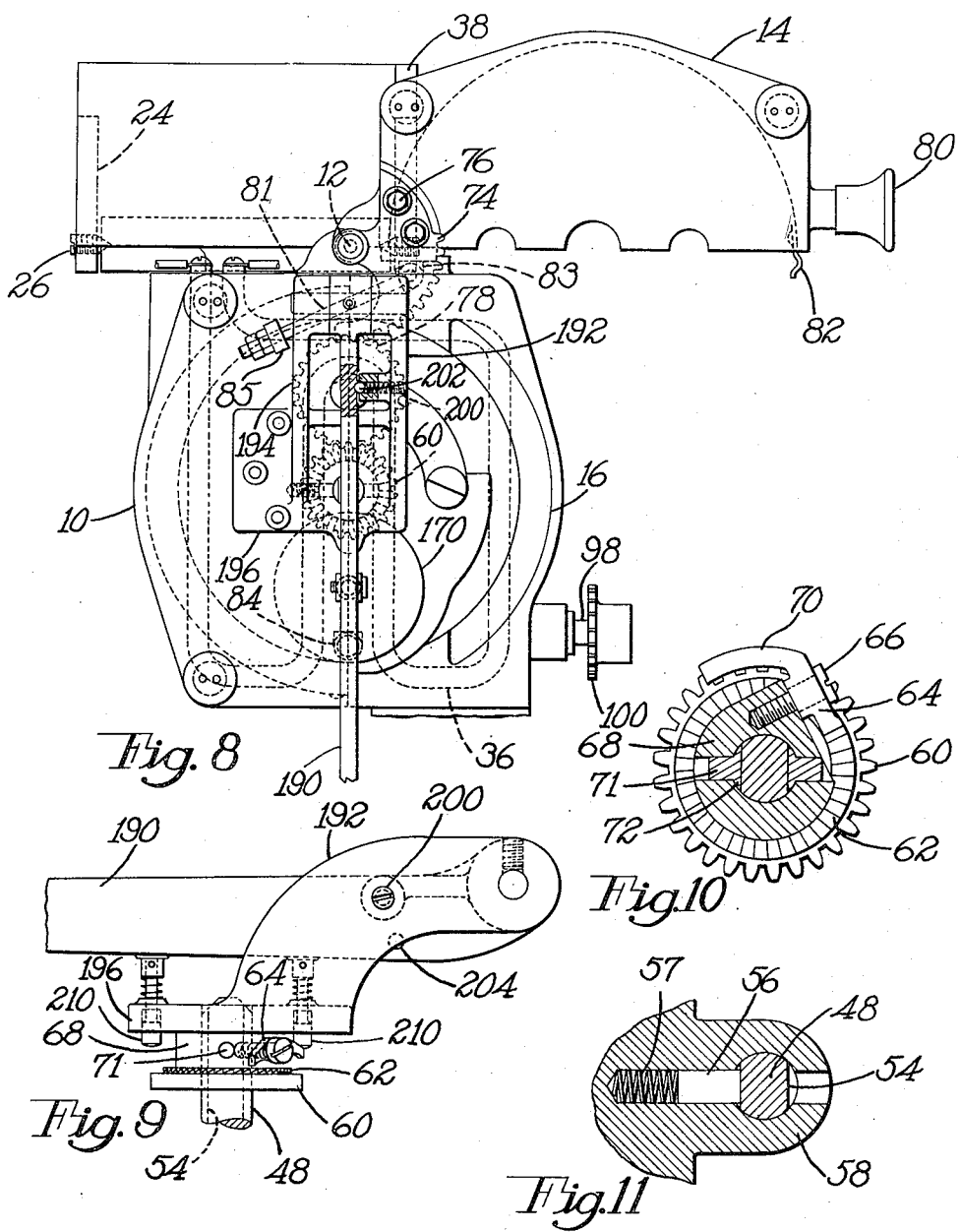
Inventor
Joseph Fossa
By his Attorney Patented Jan. 12, 1954

2,665,823

UNITED STATES PATENT OFFICE 2,665,823

CEMENT HANDLING MEANS FOR THERMOPLASTIC ADHESIVES

Joseph Fossa, Hamilton, Mass., assignor to United Shoe Machinery Corporation, Flemington, N. J., a corporation of New Jersey Application December 19, 1951, Serial No. 262,367

7 Claims. (Cl. 222—83.5)

This invention relates to cement handling means for thermoplastic adhesives, and is herein illustrated as applied to a machine for operating upon shoes.

In machines in which two parts of a piece of work are to be brought into exactly the desired position and then stuck together, the use of thermoplastic adhesives has increased. This is partly because of the strong bond which may be secured with such adhesives and partly because of their quick-setting properties which make them valuable in the case of progressive operations upon shoes, for example, such as in folding or in lasting or the like.

The use of such adhesives, however, has brought problems because of their inherent characteristics. One such problem relates to the time required for heating up a fresh supply of adhesive, especially since it seems desirable to supply the material in relatively small quantities so that there may not be a "cooking" of the adhesive due to repeated or prolonged heating thereof. It is particularly important that the operator should not be required to wait every time such a new supply is needed, not only because the operator is losing time but also because the machine is put out of production while this is going on. One of the solutions for the problem is to provide the cement in small containers and to melt the adhesive in a supplemental container while that in the preceding container is being used up. The temperatures employed for melting such adhesives are quite high and it is therefore advantageous to avoid the need for the operator to handle containers for the cement after they have been heated.

Accordingly, an important object of the invention is to provide a handling means, adapted to receive at least two containers or cans of adhesive, in which one of the cans may be engaged with a puncturing tool permitting the cement to be drawn off and in which the can or cans holding the heated supplemental supply may thereafter be brought into position for engagement with this puncturing tool without handling by the operator.

In accordance with a feature of the invention, a rotatable table is provided in a heated casing, this table being capable of turning movement around an axis and then downward movement to push a heated can against a puncturing tool.

The rotation of this table through angles sufficient to bring successive cans into operating position is effected, in accordance with another feature of the invention, by a connection between it and the door of the casing.

Still another feature of the invention lies in the provision of an ejector tool or stud which is operative to displace an empty can when the table is turned for reloading as by the opening of the door of the casing.

It is essential that there shall be no turning movement of the table while one of the cans is forced down against the puncturing tool and accordingly another feature of the invention resides in an arrangement for breaking the pawl and ratchet connection between the table and the rotating means when a hand lever is depressed to force a can down against the puncturing tool.

These and other features of the invention will best be understood from a consideration of the following specification taken in connection with the accompanying drawings in which Fig. 1 is a side elevation of the cement handling means shown as applied to a platform cover lasting machine, with the door of the casing open;

Fig. 2 is a front elevation with the door closed;

Fig. 3 is a vertical section on an enlarged scale through a dispensing pump and a valve controlling the outlet thereof;

Fig. 4 is a vertical section at right angles to Fig. 3 taken on the line IV—IV therein;

Fig. 8 is a plan view of the casing and the gear connection between the door and the table;

Fig. 9 is a side elevation, in detail, of a pawl and ratchet mechanism in said connections, the pawl being lifted by a plunger pushed down by a depressor lever which is used for forcing a can against the puncturing tool;

Fig. 10 is a horizontal section on an enlarged scale taken on the line X—X of Fig. 2; and Fig. 11 is a section on the line XI—XI of Fig. 2 showing a spring-pressed plunger for holding the table shaft in either of two positions.

Figure 1:
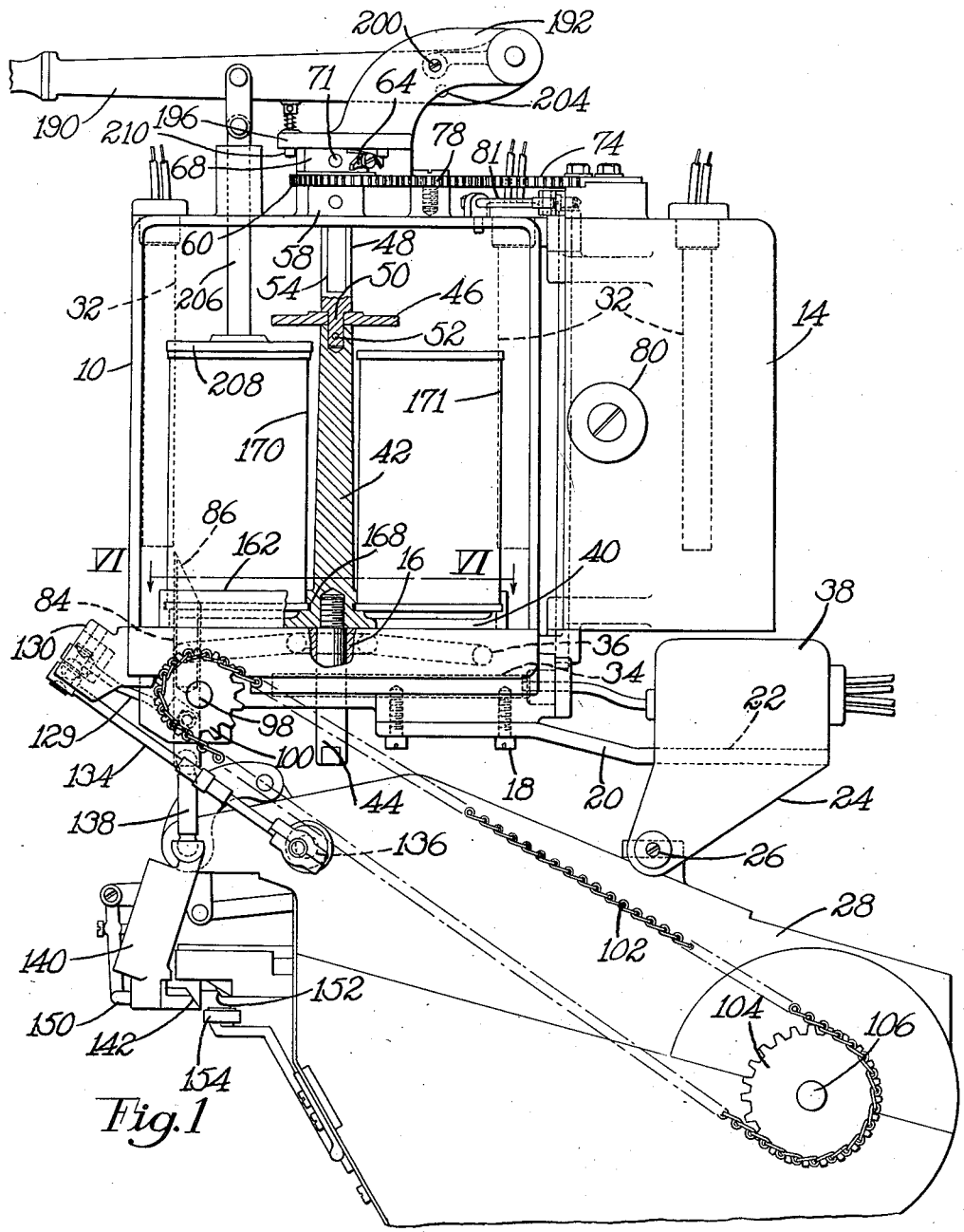

A casing 10, one-half of which is hinged at 12 (Fig. 8) so that it may serve as a door 14, has a bottom portion 16 which is attached by screws 18 (Fig. 1) to a plate 20 connected to a cross bar 22 of an inverted U-shaped bracket 24 (Fig. 2) which has depending legs provided with pivot screws 26. This enables it to be mounted upon the upper half 28 of the casing of a machine which, as herein illustrated, is a machine of the type disclosed in United States Letters Patent No. 2,544,661 granted March 13, 1951, upon an application filed in my name. It will be seen from the following description that the cement handling means is equally applicable to other machines which require a supply of adhesive material. The position of the casing with respect to these pivot screws 26 is determined by a two part strut 29 (Fig. 2) extending upwardly from the machine and having an adjustable threaded sleeve 30 connecting the parts.

The hollow casing 10 is provided with a series of vertical electric heating units 32 (Fig. 1) and in the bottom portion 16 there is another cartridge heating unit 34 and a sheathed wire unit 36, all of which may be connected to a terminal box (not shown) which is attached to the far side of a flange 38 (Fig. 1) on the bracket 24 and may be controlled by a thermostat (not shown). A rotatable table 40 is integral with an intermediate shaft 42 and has a depending shaft-extension 44 which is threaded into the intermediate portion 42. This shaft extension 44 is journaled at the bottom portion 16 of the casing and is slidable heightwise therein. At the top of the middle shaft portion 42 is a circular flange 46 which is gripped to the top of the portion 42 by a top extension 48 having a reduced end 50 which is attached to the mid portion 42 by means of a pin 52. This top extension 48 has flattened sides 54 against one or the other of which rests a spring-pressed pin 56 (Fig. 11) located within an enlargement 58 at the top of the casing. The top extension 48 is rotatable and slidable in that enlargement and has mounted upon its upper end a gear 60 (Fig. 10) having upon its upper face ratchet teeth 62 (Figs. 9 and 10). This ratchet cooperates with a pawl 64 which is pivotally attached by a screw 66 to a sleeve 68 and the pawl is provided with a tail 70. The sleeve 68 has buttons 71 with large flat heads 72 which rest against the flattened sides 54 of the top extension 48 and force the sleeve 68 to rotate with that extension.

On the door of the casing a gear segment 74 is attached by screws 76. This segment is centered on the hinge 12 and meshes with an idler gear 78 which in turn meshes with the gear 60. Upon opening movement of the door 14, the pawl and ratchet mechanism 64, 62 is normally effective to rotate the shaft 48, 42, 44 and with it the table 40. On movement in the other direction the pawl slides over the teeth of the ratchet and is ineffective. The door 14 is provided with an insulated knob 80 and a spring catch 82 (Fig. 8) and its movement is limited by a limit rod 81, hinged to a lug 83 on the door and slidable through a pivot 85 until it is stopped by nuts on the rod.

After the adhesive has been melted, provision is made, as will be seen later, for allowing it to flow out through a hollow puncturing tool 84 having a sloping upper end 86 and secured in the bottom member 16 of the casing. This tool 84 is integral with a block 88 (Fig. 3) which is positioned outside the casing beneath the bottom member and has a flange 90 (Fig. 2) by means of which there can be secured to it a recessed plate 92 containing the gears 94 of a gear pump. Outside this plate 92 there is also secured to the block 88 a valve block 96 in which there is journaled a shaft 98 attached to one of the gears. At the outer end of this shaft there is mounted a sprocket 100 enabling power to be supplied to the pump through a chain 102 (Fig. 1) connecting that sprocket and a sprocket 104 which is on a shaft 106 of the cover lasting machine.

The passage in the tool 84 is provided with a drain outlet normally closed by a screw 108 (Fig. 3) and also has an outlet 110 connecting it to the inlet chamber 112 of the gear pump. The pump plate 92 also has an outlet chamber 114 opposite which there is a passage 116 leading to a hemispherical socket 118 at the bottom of the block 88. This passage 116 is adapted to be closed by the frusto-conical head 120 of a valve member 122 having a grooved stem 124. A spring 126 (Fig. 2) surrounding the stem and interposed between an enlarged portion thereof and a flange 128 extending downwardly from the bottom plate 16 of the casing acts normally to hold the valve member 122 in closed position.

When the valve is closed in the position of Fig. 3 the material in the pump chamber 114 is returned to the inlet chamber 112 through the space around the reduced portion of the valve and thence through the passages 126 to that chamber. The valve may be opened, however, by means of a bell crank lever having a forked arm 129 fitting the grooved portion of the valve stem 124 and pivoted in a bracket 130 attached to the casing. The other arm 132 of the bell crank is pivoted to a rod 134 connected to a crank pin on a shaft 136 (Fig. 1) which is arranged to be partially rotated by treadle connected parts such as are shown in Letters Patent of the United States No. 2,476,290, granted July 19, 1949, upon an application in my name.

When the valve is opened adhesive is forced through a connecting pipe 138 which is joined by a ball and socket connection to the upper end of a shoe bottom rest and lasting shield 140. This rest 140 is provided with a passage terminating in an outlet opening in a rearwardly and downwardly inclined surface 142 where it is applied to a platform cover 144 (Fig. 2) which is being drawn over the bottom 146 of a shoe 148 by means of the action of a front gripper jaw 150 cooperating with a rear gripper jaw 152 (Fig. 1). The work is rested against an edge gage roll 154 and is moved progressively past the nozzle and the jaws by means of a feed foot 156 cooperating with a retainer 158 as in my prior patented machine. A free flow of the cement through the shoe bottom rest 140 is insured by an electric heating unit 160 (Fig. 2).

Figure 5:
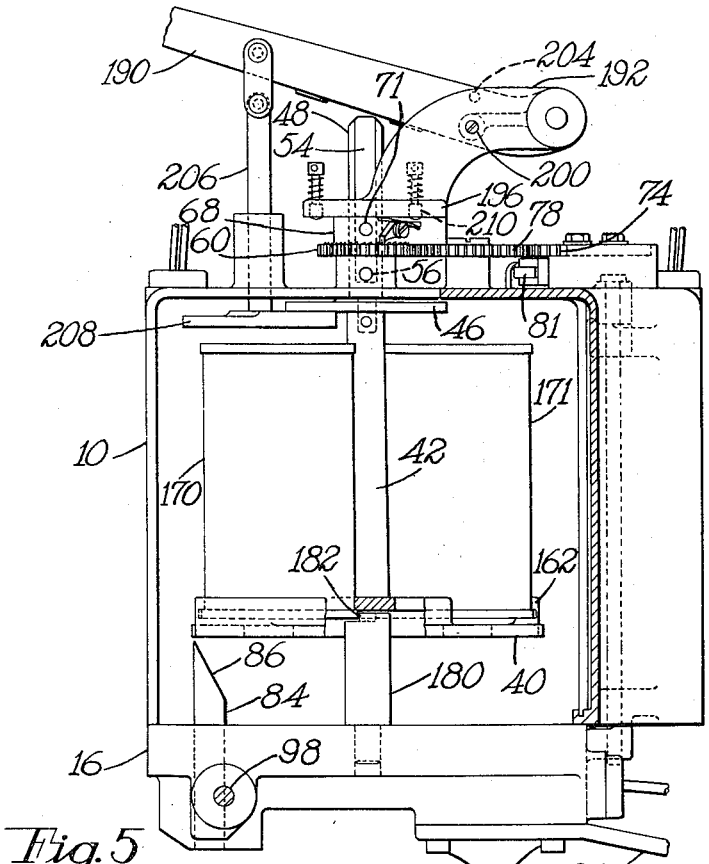
Fig. 5 shows in side elevation the heated casing and the table therein turned part way by a partial opening movement of the door of the casing and has a fragment of the table removed to show an ejecting pin.
Figure 7:
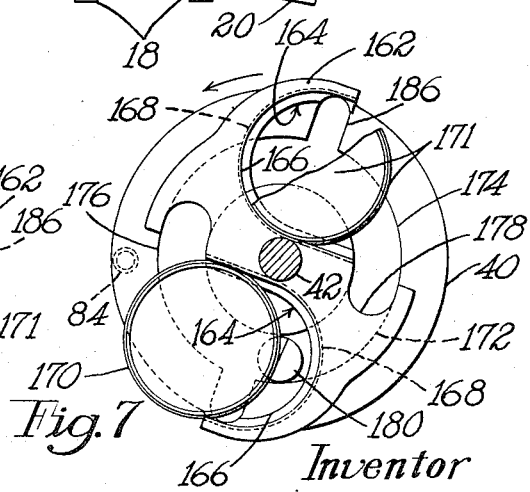
Fig. 7 is a similar view but with the table raised and turned to another position to show the ejection of an empty can.

Returning now to the specific construction of the table 40 it will be seen that it is provided with upstanding rims 162 (Fig. 1) each of which has a semicircular recess 164 (Fig. 7) provided with a bottom ledge 166 and a groove 168 which cooperates to receive a beaded lower end of a container such as one of the cans 170, 171. Inasmuch as the adhesive is solid at ordinary temperatures it is not necessary that this can shall have a cover. The table itself is provided on its under surface with a circular groove 172 which is concentric with two curved slots 174 and 176 having substantially semicircular ends as at 178 and extending as far as the inner curve of the thin supporting flange 166. In the bottom portion 16 of the casing there is erected an ejector stud 180 which is alined with the groove 172 and which when the table is lowered, as will be later explained, projects through one or the other of the slots 174 and 176. It will be noted from Fig. 5 that the upper end of this ejecting tool or stud is cut away to provide a shoulder 182 which lies opposite the bottom rim of the can so that an empty can on the turret which comes into engagement with this shoulder is displaced as indicated in Fig. 7 and pushed out of the open door of the casing. The table 40 is provided with slotted recesses 186 which are large enough to pass the puncturing tool 84.

When the contents of a can 170 has been melted and the can has been moved into delivery position above the puncturing tool 84 there is brought into action a depressor lever 190 pivoted between the arms 192 and 194 (Fig. 2) of a bracket 196 screwed to a boss 198 on the top of the casing. In one of these arms there is provided a spring-pressed detent 202 (Fig. 8), the tension of the spring of which may be varied by means of a screw 200, said detent cooperating with recesses 204 (Fig. 5) in the lever 190 to hold it in one position or the other. The lever is connected by links to the upper end of a rod 206 extending through the top of the casing and provided at its lower end with a circular plate 208.

This plate is about the size of the top of a can containing the adhesive and when one of them, such as the can 170, is brought into the position in which it is shown in Fig. 8 the depressor lever 190 is lowered to push the plate against the top of the can and force it and the table down so that the puncturing tool 84 enters the bottom of the can and allows the contents to be drained out into the pump chamber 112. It will be noted that the upper end of the upper shaft portion 48 lies directly beneath the lever 190 so that the latter is also effective to lower the shaft carrying the table 40 without requiring it to be pushed down by the force exerted by the plate 208 on the cam.

Whenever the depressor lever 190 is lowered, and as a result a can is brought into engagement with the puncturing tool 84, it is not desired to have the table rotated by swinging movement of the door 14 and accordingly plungers 210 slidable in the bracket 196 and normally held in upward position by springs are also depressed as shown in Fig. 1. Thus, no matter which side of the table is beneath the depressor plate 208 one of these plungers will overlie the tail 70 of the pawl 64 and will lift this pawl out of engagement with the ratchet 62. This does not interfere with the rotation of the gears 60 and 78 or the segment 74 but renders them ineffective to turn the table. It will also be noted that the depressor plate 208 underlies the flange 46 upon the table shaft with the result that when the depressor lever 190 is raised, after a can 170 has become empty, it is effective, by engagement with the underside of the flange 46, to raise the table and pull the can off the puncturing tool 84.

Figure 6:
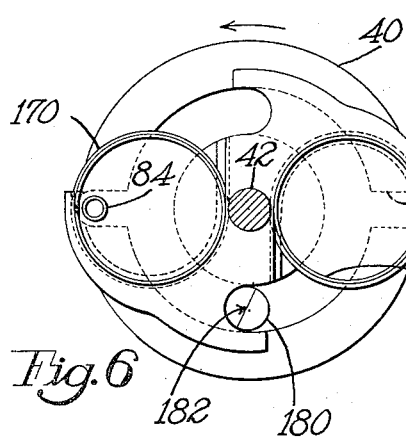
Fig. 6 is a horizontal section on the line VI—VI of Fig. 1 to show the rotatable table, with cans positioned thereon.

In using the cement handling means to insure the constant supply of adhesive to the particular machine with which the device is associated, an operator will open the door of the casing and insert a can 180 in the adjacent recess 164 of the table. He will then, if this is the beginning of operations for the day, shut the door of the casing and allow this first can to heat up. When enough time has passed so that this melting of the adhesive has been accomplished he will again open the door causing the table to rotate 180° thereby bringing the can 170 over the puncturing tool 84. He then will add another can 171 to the empty recess 164 and close the door. Next, he will lower the depressor lever 190 forcing down the plate 208 to insure that the can 170 is pressed down on the puncturing tool and will at the same time lower the table 40 in which a slotted recess 186 will be in position above the puncturing tool. This desired position of the table will be assured by the engagement of a semicircular end 178 of one of the slots with the left side of the ejector 180 as indicated in Fig. 6.

When the contents of the first can 170 has been used up and the table has been raised by the lifting of the depressor lever 190, the operator will open the door, turning the table through 180°, and bringing the empty can against the shoulder 182 of the ejector 180 so that the empty can is pushed out of the casing. At the same time the next can 171 will be brought into delivery position above the puncturing tool 84. The operator will then supply a filled can to take the place of the empty one and will close the door and depress the lever 190 to puncture the can 171 in which the contents are already melted. It will be noted that, save for the first operation of the day, the successive cans of adhesive will have had time to melt during the period when the contents are being removed from the other can.

Having thus described my invention, what I claim as new and desire to secure by Letters Patent of the United States is:

1. In a cement handling means for thermoplastic adhesive, a heated casing having a door, a table for separate containers of adhesive rotatably mounted in said casing to carry a container from a loading position to a delivery position, said table having arcuate openings, an ejector stud beneath the table projecting through an opening, and connection between said door and the table to rotate the latter when the door is moved, said connection including a ratchet and pawl, the rotation of the table being effective to cause the stud to eject an empty container.

2. In a cement handling means for thermoplastic adhesive, a heated casing, a table movable rotatably and heightwise within said casing, recesses on said table cooperating with the bottom portion of cans of adhesive to move the latter positively, a puncturing tool in said casing positioned beneath the table and adapted to cooperate with the cans of adhesive, said table having openings beneath the recessed portions thereof, an ejecting tool in line with one of said openings, and means for moving said table up and down to bring at least one of said tools into engagement with a can.

3. In a cement handling means for thermoplastic adhesive, a casing having a puncturing tool fixed in the bottom portion thereof with its sharp end upward, a table rotatably mounted in said casing and arranged for vertical movement therein, and a depressor extending into said casing and arranged to contact the top of a container of adhesive to push it and the table down to bring the container into engagement with the puncturing tool thereby to drain the adhesive from the container.

4. In a cement handling means for thermoplastic adhesive, a casing, a table for containers of adhesive rotatably mounted therein and arranged for up and down movement, a puncturing tool beneath said table, a lever connected to a reciprocable plate above the containers arranged to engage the top of a container which is above the puncturing tool and to depress it thereagainst, and means connected to the table, engageable by said plate, for raising the table when the plate is raised.

5. In a cement handling means for thermoplastic adhesive, a casing, a puncturing tool projecting upwardly from the bottom of the casing, a table mounted upon a shaft which is rotatable in the casing and is slidable therein, means including a pawl and ratchet mechanism for rotating said table, a depressor mechanism for pushing a container of adhesive and the table down to cause the puncturing tool to open the bottom of the container, and means forming part of said depressor mechanism for disconnecting the pawl and ratchet when the depressor is in its lowered position.

6. A cement handling means as in claim 5 in which the table has curved slots extending less than 180° around an inner portion of the table, and an ejector stud in the bottom of the casing spaced from the puncturing tool, said slots cooperating respectively with said ejector stud and said puncturing tool to permit depression of the table.

7. In a cement handling means for thermoplastic adhesive, a casing having a swingable door, a shaft journaled in said casing and slidable heightwise therein, a table on said shaft, a puncturing tool projecting upwardly from the bottom of the casing, a table-rotating ratchet, means including a pawl connecting said door to said ratchet, a depressor lever, a depressor plate above the container connected to said lever, plungers beneath the lever and above said pawl, said plungers being capable of being depressed by the lever so that a plunger will lift the pawl in either of two positions of the table, and a flange on the shaft overlying the depressor plate.

JOSEPH FOSSA.

References Cited in the file of this patent

UNITED STATES PATENTS

| Number | Name | Date |
|---|---|---|
| 1,316,152 | Friewald | Sept. 16, 1919 |
| 1,478,590 | Tamborello | Dec. 25, 1923 |
| 2,035,808 | Helmuth et al. | Mar. 31, 1936 |
| 2,217,563 | Sartain | Oct. 8, 1940 |
| 2,353,519 | Spurr | July 11, 1944 |
| 2,562,081 | Beaudot | July 24, 1951 |